Feb. 24, 1970           A. E. VAIL           3,496,913
BIRDHOUSE WITH SNAP-OUT WALL PANELS
Filed Sept. 26, 1968           2 Sheets-Sheet 1
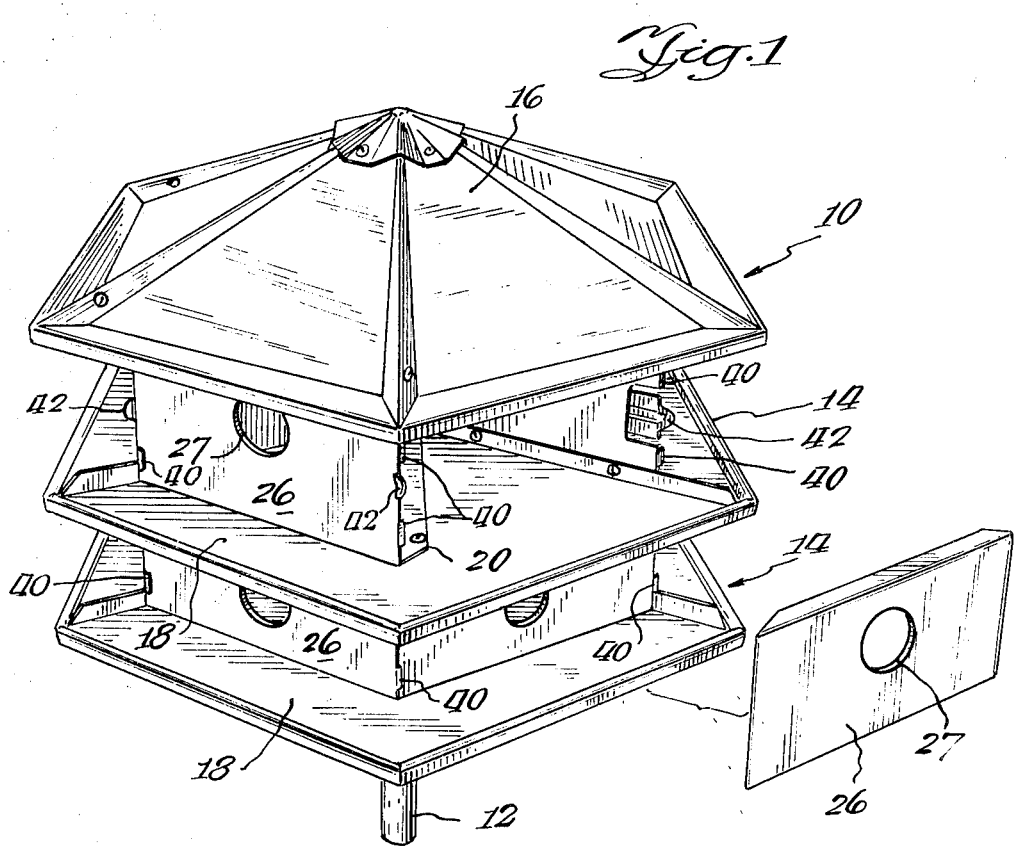
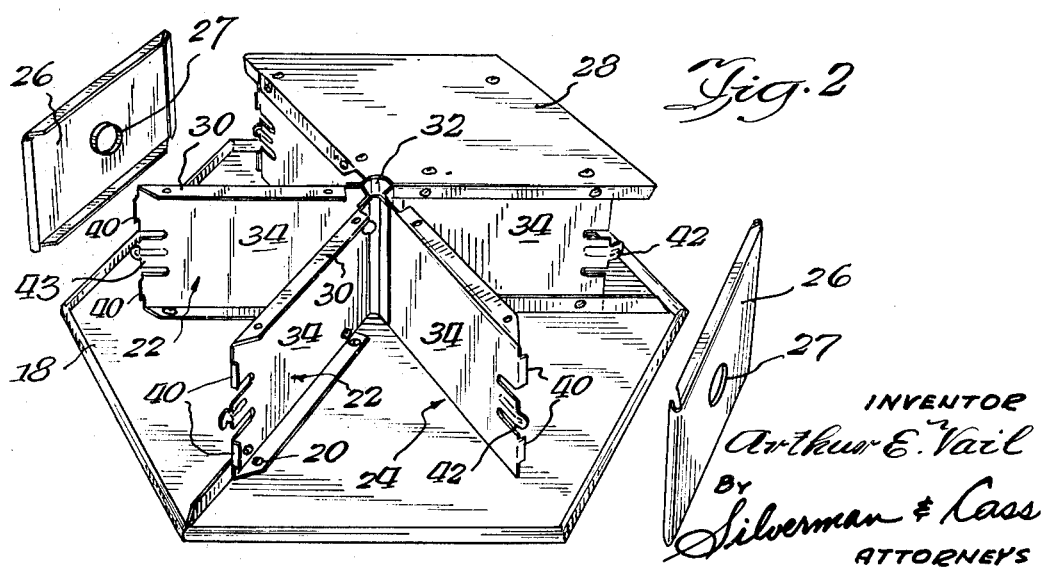
INVENTOR
Arthur E. Vail
BY
Silverman & Cass
ATTORNEYS Feb. 24, 1970     A. E. VAIL     3,496,913
BIRDHOUSE WITH SNAP-OUT WALL PANELS
Filed Sept. 26, 1968     2 Sheets-Sheet 2
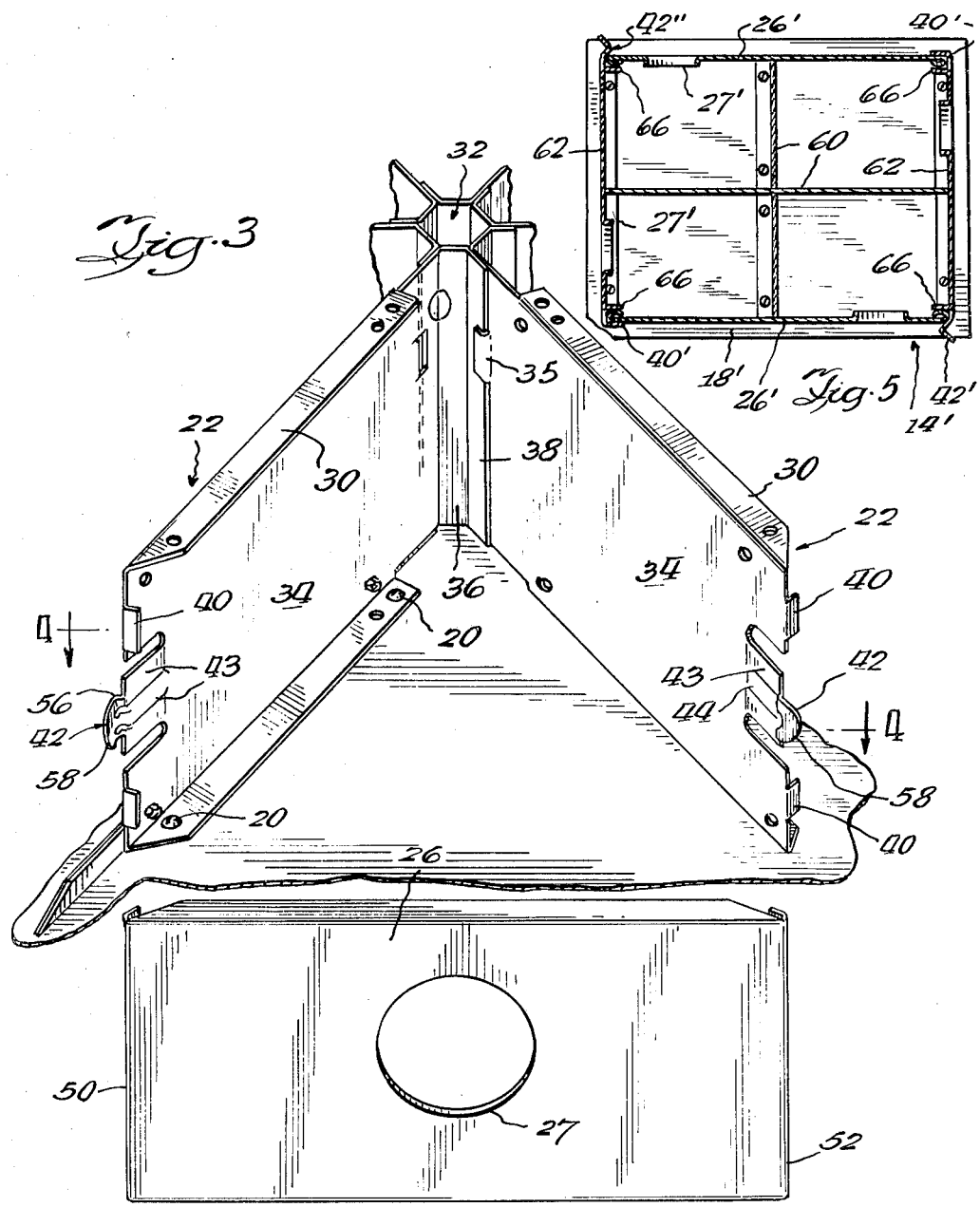
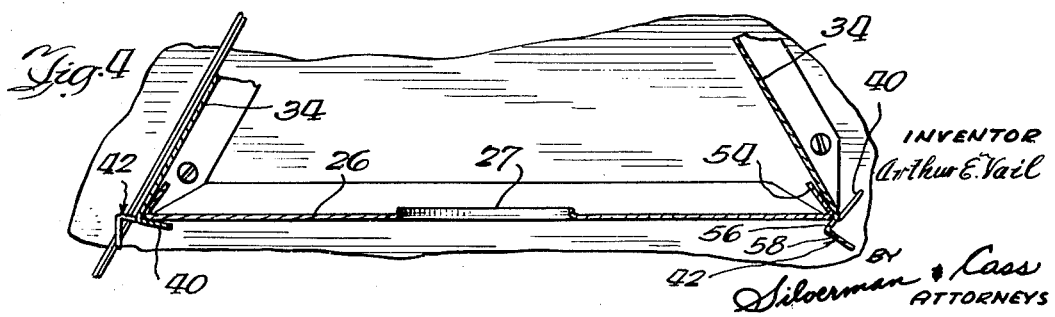
INVENTOR
Arthur E. Vail
BY Silverman & Cass
ATTORNEYS

United States Patent Office 3,496,913
Patented Feb. 24, 1970

3,496,913
BIRDHOUSE WITH SNAP-OUT WALL PANELS
Arthur E. Vail, Griggsville, Ill., assignor to Trio Manufacturing Company, Griggsville, Ill., a corporation of Illinois
Filed Sept. 26, 1968, Ser. No. 762,932
Int. Cl. A01k *31/00*
U.S. Cl. 119—23      9 Claims

ABSTRACT OF THE DISCLOSURE

A multiple dwelling birdhouse having at least one tier which is divided into a plurality of individual nesting compartments. Each tier includes structural members affixed to the floor portion thereof which cooperate to define all but one of the walls of the individual nesting compartments, and a plurality of snap-out wall panels associated with said structural members in such a manner as to complete the wall formation for the individual compartments. The structural members have latch means associated therewith whereby the individual wall panels are releasably maintained in position but are adapted to be snapped out of association with said structural members to provide for access to the interior of the nesting compartments by the owner of said house. In addition, there are disclosed novel latch means which permit the use of identically shaped structural members for defining the nesting compartments, thereby materially reducing the number of different parts needed for the birdhouse.

CROSS-REFERENCE TO RELATED APPLICATIONS

In U.S. Reissue Patent No. 25,878, issued to the applicant herein, Arthur E. Vail, on Oct. 12, 1965, there is described and claimed a birdhouse specially designed for martins. The birdhouse disclosed in said patent is provided with hinged doors or wall panels so that the birdhouse owner has access to the individual compartments for cleaning purposes. Also, in the U.S. application, Ser. No. 589,254, now Patent No. 3,410,248, and U.S. application, Ser. No. 599,619, now Patent No. 3,418,976, there are disclosed additional embodiments of martin houses provided with clean-out doors.

BACKGROUND OF INVENTION

This invention relates generally to a multicompartment birdhouse, and more particularly is directed to a birdhouse construction which includes a snap-out wall panel which facilitates assembly and provides for access to the nesting compartments by the owner.

Although not necessarily limited thereto, the birdhouse embodying the present invention is especially useful for attracting and housing martins. Martins, as is well known, are prodigious as effective destroyers of garden insects and other pests so that it is very desirable to attract colonies of these birds to residential areas. The martin is a gregarious species and thus will nest only in a birdhouse of the multicompartment variety and then only if the house is clean, that is, free from nests, twigs and debris of other birds. For instance, sparrows often will occupy martin houses after the martins have departed for the winter so that it is necessary to clean out the house in order to attract the martins on their return. In this regard, it should be noted that providing the house is properly maintained, martins will return to nest in the same birdhouse year after year.

The present invention is an improvement over the martin houses disclosed in the above-mentioned patents. In said prior art martin houses, the clean-out doors or wall-panels, whichever the case may be, were pivotally mounted to the structural members affixed to the floor of said house. With this arrangement, it was necessary to provide one or more rods upon which the doors or panels were journaled, as well as the necessary fastening means to maintain the rods in position. This mode or manner of mounting the clean-out doors, while effective and having been accorded remarkable commercial acceptance, required considerable assembly time. When the martin house is sold in a partially preassembled condition, the assembly time as well as the number of parts used are factors which affect the overall cost of the house. Even if the martin house is purchased in knockdown form, the new birdhouse owner is faced with a rather lengthy and laborious assembly procedure.

The above noted disadvantages are overcome by the present invention, in that there is provided an arrangement whereby once the fixedly attached structural members are in place, the clean-out doors or wall panels may be quickly and easily snapped into and out of position. Thus, as compared to the prior art structures, not only are the parts for pivotal mounting eliminated, but also the additional assembly time occasioned thereby is obviated. Most importantly, these manufacturing and assembly advantages are realized while maintaining the clean-out feature of the above noted patents, which is of extreme importance to martin house owners.

In addition, with the use of the novel latching arrangement of the present invention for the snap-out panels, identically shaped elements may be employed in the construction of the birdhouse. This feature thus further reduces the total number of different parts needed, and correspondingly lowers the manufacturing costs of said house.

DESCRIPTION OF THE DRAWINGS

FIGURE 1 is a perspective view of a two-tiered multi-compartment birdhouse in accordance with the present invention, with one of the snap-out panels illustrated in exploded fashion;

FIGURE 2 is a partially exploded perspective view of one of the tiers of house illustrated in FIG. 1 with a portion of a structure defining the upper extremities of the nesting compartments removed to illustrate the construction of the interior wall elements;

FIGURE 3 is a fragmentary perspective view on an enlarged scale of one of the nesting compartments shown in FIG. 2;

FIGURE 4 is a fragmentary sectional view taken along the line 4—4 of FIG. 3 in the direction indicated, and illustrating the snap-out panel in place; and FIGURE 5 is a sectional view of another form of birdhouse constructed in accordance with the present invention.

DESCRIPTION OF THE ILLUSTRATED EMBODIMENTS

Referring now to the drawings, a birdhouse constructed in accordance with the present invention is shown in FIG. 1, and designated generally 10. The birdhouse 10 is mounted on a pole 12 and includes two stacked or superposed tiers, each being designated generally 14. It is intended that one or more tiers may be employed, and the birdhouse 10 is preferably constructed so that the peaked roof section 16 may be removed and additional tiers added.

The general construction of the individual tiers 14 is illustrated in FIG. 2. Basically, each tier includes a floor structure 18 which may be of one piece construction or a plurality of elements fastened together, as illustrated. Affixed to the floor 18 by screws 20 or other suitable means, is a plurality of radially disposed identically shaped structural elements 22, which cooperate to define the interior walls of the individual nesting compartments 24. The wall formation for the nesting compartments 24 is completed by means of the snap-out panels 26, which provide the outer walls for the individual compartments.

While the embodiment of FIGS. 1 through 4 employs a snap-out panel 26 for each compartment, it is understood that an appropriately shaped panel may be employed which is associated with and defines the outer wall portion for two or more nesting compartments, the hereinafter discussed latching arrangement for said panels being adjusted accordingly. Irrespective of the specific panel construction employed, apertures 27 are provided, one for each compartment to permit the egress and ingress of the birds.

The tier 14 illustrated in FIG. 2 is in fact the upper most tier of the birdhouse shown in FIG. 1. In this regard, the upper extremities of the nesting compartments 24 are defined by one or more cover members 28 which are bolted or otherwise fastened to the flanges 30 on the upper edges of the elements 22, the peaked roof structure 16 being fastened to said cover 28. In FIG. 2, two of the elements 28 have been removed so that the arrangement of the structural members 22 may be viewed. Accordingly, the birdhouse owner need merely remove the peaked roof 16 and the cover members 28 to add additional tiers, the floor element 18 of one tier serving to define the upper extremities of the nesting compartments of the adjacent lower tier.

In order to ensure stable mounting of the house 10 on the pole 12, the floor members 18 of one or more of the lower tiers are provided each with an aperture (not shown), and the inner portions of the elements 22 are constructed to define passageways 32 which cooperate with said apertures to accommodate pole 12. Preferably, the inner portions of the elements 22 are constructed in accordance with the teachings of U.S. patent application Ser. No. 589,254, as will be detailed hereinafter.

Each element 22 has a planar wall segment 34 which, in fact, provides a common wall for adjacent compartments. Each segment 34 has a struck-out tab 35 and canted flanges 36 and 38 approximate the inner portion thereof. Thus, upon assembly, the respective flange formations 36 cooperate to define the passageway 32, while the struck-out tabs 35 provide a channel for reception of the flanges 38 on the adjacent elements to interlock said elements 22.

As alluded to previously, there is no need for the provision of passageway 32 above the first two or three tiers. Accordingly, the upper tiers may utilize structural members which are engaged in "egg crate" fashion, as illustrated in U.S. application Ser. No. 599,619.

The latch arrangement for the snap-out wall panels 26 is provided by the structural members 22 and can best be viewed with reference to FIGS. 3 and 4. In this regard, it should be noted that the individual structural elements 22 are of identical shape and of integral construction. In the illustrated embodiment, elements 22 are stamped or otherwise formed from a section of sheet material.

Each structural element 22 is provided on its outer edge with a flange formation 40 and a locking tab arrangement 42. The tab arrangement 42 is canted with respect to the planar segment 34 of body element 22 and connected thereto by means of a resilient springlike section 43, which section preferably is provided with a strengthening rib 44. Flange formation 40 and tab arrangement 42 are disposed so as to cooperate or be associated with opposite sides of the planar segment 34. Accordingly, with the individual compartment 24 of FIGS. 3 and 4 are a reference point, it is believed clear that the flange formation 40 on one of the associated structural elements 22 presents a first channel-like means for said compartment, while the locking tab 42 of the other associated structural element 22 defines a second channel-like means for said compartment. The aforementioned channel-like means are realized due to the angular relationship between the planar segments 34 and their respective flange formations 40 and tab arrangements 42.

With the structural elements 22 in place, as illustrated in FIG. 2, it is believed clear from the foregoing that each compartment 24 is provided with both first and second channel-like means which cooperate to define a latching arrangement for the snap-out panel to be associated therewith. Also, it should be noted that each structural element 22 provides the first channel-like means for one of its associated compartments, as well as the second channel-like means for the other of its associated compartments.

The mode of assembly of the individual snap-out panels 26 is best illustrated in FIGS. 3 and 4. The first step in assembly is to engage one edge 50 of the panel 26 behind the flange formation 40 so that said edge is in fact received in the channel-like means defined thereby. Next, the opposite edge 52, which preferably is provided with a reverse bent flange 54, is engaged against the locking tab 42. Locking tab 42 includes a first section 56, which is joined to the springlike section 43 and cooperates with segment 34 to define said second channel-like means, and a second reverse bent section 58. Thus, when panel edge 52 initially is engaged with tab 42, the flange 54 is in contact with tab section 58, whereby continued pressure will cause the entire locking tab 42 to be biased in a counterclockwise direction permitting edge 52 to snap past the apex or junction of the sections 56 and 58 of tab 42 into the channel-like means defined thereby. The spring action afforded by section 43 then returns the locking tab arrangement 42 to its initial position. Thus, it can be seen that the snap-out panel 26 is held firmly, but releasably, in place by the disposition of its opposite edges 50 and 52 behind the flange formation 40 and the locking tab arrangement 42, respectively.

To remove the panel 26 for clean-out purposes or disassembly of the birdhouse, the owner need merely grasp said panel by way of the aperture 27 and pull. When the panel 26 is pulled, the edge 50 will engage locking tab section 56 to bias the tab arrangement 42 in opposition to the force exerted by the leaf spring section 43, thus permitting edge 52 to be snapped out of engagement from behind the tab arrangement 42. Once this has been accomplished, the opposite panel edge 50 can be easily disengaged from behind the flange formation 40 and the entire panel removed, thus exposing the interior of compartment 24. It should be noted, however, that to facilitate the snap-out removal panel 26, a birdhouse owner need merely press his thumb against the tab section 58 manually to bias same in a counterclockwise direction. The leaf spring section 43 is constructed so that the force exerted thereby is of sufficient strength to preclude inadvertent release of the panels 26 by the birds engaging against said panels or section 58 of the locking tab arrangement 42.

FIG. 5 discloses a modified form of the invention, alternative to the radially compartmented birdhouse of FIGS. 1 through 4. The rectangular shaped birdhouse construction of FIG. 5 is designated generally 10', with the structural elements thereof similar to those discussed above accorded like reference numerals, primed.

The general construction of the birdhouse 10' may be that as disclosed in the aforementioned U.S. patents. That is to say, each tier 14' is provided with a plurality of nesting compartments 24' which generally are rectangular in shape, as opposed to the wedgelike configuration of compartments 24 of birdhouse 10. Also, it should be noted that each tier may contain four compartments as illustrated herein, or the tier area may be divided up into six or more compartments.

Turning now to the specific construction of FIG. 5, each tier 14' includes a floor section 18' having certain structural elements of the tier affixed thereto. It is in regard to these structural elements that the embodiment of FIG. 5 differs from that of FIGS. 1 through 4. In house 10, only the elements 22 which defined the inner wall structure of the compartments were affixed to the floor 18. In the embodiment of FIG. 5, however, there are employed two or more inner structural elements 60 which preferably are affixed to the tier floor 18', and a pair of spaced parallel members 62 affixed to the floor 18', and cooperating with the said elements 60 to define all but one wall of the individual nesting compartments 24'. To complete the wall formation for said individual compartments 24', a plurality of apertured snap-out wall panels 26' are provided.

Regarding the latching means for the panels 26', each of the stationary parallel members 62 is provided with a flange formation 40' on one edge and a locking tab arrangement 42' on the other, which arrangements define first and second channel-like means. Note that due to the perpendicular disposition of the members 62 and panels 26' it is necessary that flange formations 40' and tab arrangements 42' include the flanges 66, or some similar structure, so that the channel-like means for reception of the panel edges may be realized.

Thus, it is believed clear that the panels 26' may be removably engaged in the respective channel-like means provided on the ends of elements 62, and as was discussed with regard to FIGS. 1 through 4, may be snapped into and out of position.

The snap-out panels 26' and the stationary panels 62 may be apertured at 27', as illustrated, or as an alternate, the apertures 27' in stationary panels 62 may be eliminated and all necessary apertures formed in panels 26'. In addition, instead of a snap-out panel 26' bridging two or more compartments, each compartment may be provided with its own snap-out panel, the latch means structure adjusted accordingly.

The invention thus provides an improved multicompartment birdhouse that effectively utilizes duplication of parts and employs novel means to provide clean-out facilities, which serve to simplify the overall construction and materially reduce assembly time, all to the ultimate benefit of the purchaser. It will be apparent that various changes and modifications may be made in the construction and arrangement of the components of the birdhouse without departing from the spirit and scope of the invention.

What it is desired to secure by Letters Patent of the United States is:

1. A multiple dwelling birdhouse having a plurality of individual nesting compartments comprising; a floor, structural members affixed to said floor to define all but one side of the wall formation of each compartment, a plurality of snap-out wall panels associated with said structural members to complete the wall formation of each compartment, each of said wall panels including an aperture to permit the ingress and egress of the birds, and latch means associated with said structural members providing for releasable snap-out disposition of each of said wall panels, each latch means including a flange formation which defines a first channel-like means for the reception of one edge of an associated panel, and a resilient locking tab defining a second channel-like means for reception of the opposite edge of said panel, said resilient locking tabs permitting the respective panels to be snapped into and out of association with the structural members to provide for a person having access to the interior of the nesting compartments.

2. A birdhouse as defined in claim 1 wherein said structural members include a plurality of radially disposed elements which cooperate to define the interior walls of said compartments, each element having a planar wall segment which serves as a common interior wall for adjacent compartments, said elements having outer edges associated with said snap-out wall panels.

3. A birdhouse as defined in claim 2 wherein at least two of the said outer edges are provided with both a flange formation and a resilient locking tab which define a pair of first and second channel-like means, one said channel-like means being disposed on each side of the associated planar wall segment.

4. A birdhouse as defined in either of claims 2 or 3 wherein there is a snap-out wall panel for each nesting compartment, with the outer edges of said elements providing a portion of the latch means for the snap-out wall panels of the compartments adjacent each said element.

5. A birdhouse as defined in claim 1 wherein said structural members include a pair of spaced substantially parallel planar elements affixed in said floor and defining with said snap-out wall panels the exterior walls of the nesting compartments, said planar elements being of identical construction, and each having a flange formation on one end and a resilient locking tab arrangement on the other end, whereby each planar element provides a pair of first and second channel-like means, each of said pair defining a portion of the latch means for a different snap-out wall panel.

6. A birdhouse as defined in claim 5 wherein two snap-out wall panels are employed on opposite sides of the house.

7. A multiple dwelling birdhouse having at least one tier which is divided into a plurality of nesting compartments, each tier comprising: a floor; a plurality of radially disposed elements which define the inner wall structure of the compartments, each element having a planar segment that provides a common wall for adjacent compartments; and a plurality of snap-out wall panels associated with the outer edges of said radially disposed elements to define the outer wall structure of said compartments; and latch means for removably maintaining each of said snap-out wall panels in association with said inner wall structure, each latch means including, a flange formation which defines a first channel-like means for the reception of one edge of an associated wall panel, and a resilient locking tab defining a second channel-like means for reception of the opposite edge of said wall panel, said resilient locking tabs permitting the panels to be snapped into and out of position to provide for access to the interior of the nesting compartments.

8. A four-sided multicompartment birdhouse including at least one tier, said tier comprising: a floor; an outer wall structure; an inner wall structure dividing the space enclosed by said outer wall structure into a plurality of nesting compartments; said outer wall structure including a pair of spaced substantially parallel wall elements affixed to said floor to define two sides of said tier, and a plurality of snap-out wall panels associated with the inner wall structure and said pair of elements to define the other two sides of said tier; and latch means for each panel removably maintaining said panels in association with said pair of elements and the inner wall structure, each latch means including, a flange formation which defines a first channel-like means for the reception of one edge of an associated wall panel, and a resilient locking tab defining a second channel-like means for reception of the opposite edge of said wall panel, said resilient locking tabs permitting the panels to be snapped into and out of position to provide for access to the interior of the nesting compartments.

9. A birdhouse as defined in either one of claims 7 or 8 wherein there is provided a snap-out wall panel for each compartment and said radially disposed elements are of identical construction with the outer edge of each defining a portion of the latch means for the snap-out wall panels of the compartments adjacent thereto.

References Cited

UNITED STATES PATENTS

| | | | |
|---|---|---|---|
| 1,587,804 | 6/1926 | Stein | 119—23 |
| 2,236,593 | 4/1941 | Booth | 119—23 |
| 2,951,312 | 9/1960 | Engh | 46—19 |

HUGH R. CHAMBLEE, Primary Examiner